(12) United States Patent
Landgraf et al.

(10) Patent No.: US 8,152,194 B1
(45) Date of Patent: Apr. 10, 2012

(54) UTILITY TRAILER SECURITY DEVICE

(76) Inventors: Larry Landgraf, Mesa, AZ (US); Sam F. Manna, Jr., Phoenix, AZ (US); Maggie Ann Fitzgerald, Maricopa, AZ (US)

( * ) Notice: Subject to any disclaimer, the term of this patent is extended or adjusted under 35 U.S.C. 154(b) by 221 days.

(21) Appl. No.: 12/700,648

(22) Filed: Feb. 4, 2010

(51) Int. Cl.
*B60D 1/60* (2006.01)

(52) U.S. Cl. ............ 280/507; 70/14; 70/34; 70/32; 70/33; 70/232; 70/258; 70/20; 70/31; 70/2; 70/6; 70/13; 70/158; 70/163; 70/164

(58) Field of Classification Search ............... 280/507; 70/14, 34, 32, 33, 232, 258, 20, 31, 2, 6, 70/13, 158, 163, 164
See application file for complete search history.

(56) References Cited

U.S. PATENT DOCUMENTS

| | | | |
|---|---|---|---|
| 2,707,385 A * | 5/1955 | Fisler | 70/134 |
| 3,844,143 A * | 10/1974 | Hudson | 70/14 |
| 3,884,055 A | 5/1975 | Vuillemot | |
| 4,186,575 A | 2/1980 | Bulle | |
| 4,440,005 A | 4/1984 | Bulle | |
| 4,480,450 A * | 11/1984 | Brown | 70/14 |
| D293,650 S | 1/1988 | Donalies et al. | |
| D312,958 S * | 12/1990 | Aguilar, Jr. | D8/346 |
| 5,332,251 A * | 7/1994 | Farquhar | 280/507 |
| 5,775,139 A | 7/1998 | Sellers | |
| 6,467,317 B1 * | 10/2002 | Hillabush et al. | 70/56 |
| 6,578,392 B1 * | 6/2003 | Bowman et al. | 70/14 |
| 6,598,432 B1 * | 7/2003 | Dwyer | 70/14 |
| 6,786,068 B2 | 9/2004 | Spooner | |
| 6,862,904 B1 * | 3/2005 | Hubbart | 70/14 |
| 2003/0151228 A1 | 8/2003 | Spooner | |
| 2003/0167806 A1 | 9/2003 | Witchey | |
| 2003/0205884 A1 | 11/2003 | Koy | |

* cited by examiner

*Primary Examiner* — Joanne Silbermann
*Assistant Examiner* — Marlon Arce

(57) ABSTRACT

An object of this invention is to provide a way for a person to lock and secure the hitch of an unhitched utility trailer. Another object of this invention is to allow a person to keep an unhitched utility trailer from being stolen when the utility trailer is not hooked to a truck hitch.

1 Claim, 3 Drawing Sheets

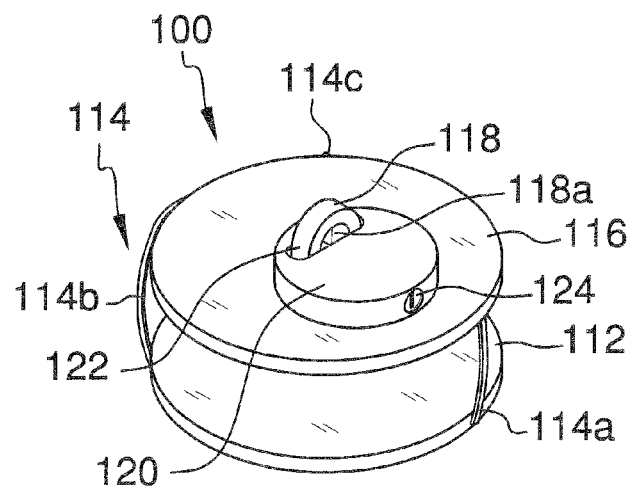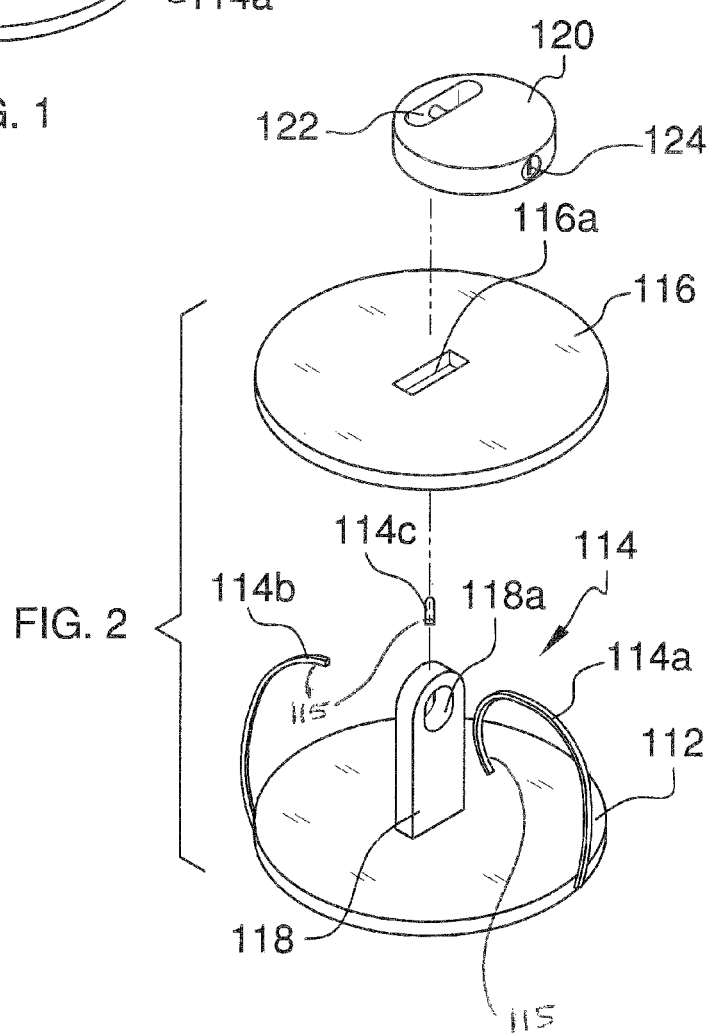

UTILITY TRAILER SECURITY DEVICE

FIELD OF THE INVENTION

The present invention is directed to a utility trailer security device for locking an unhitched utility trailer including a base, a top plate, a locking post, and a key lock to allow a person to lock and secure the hitch of an unhitched utility trailer.

BACKGROUND OF THE INVENTION

An object of this invention is to provide a way for a person to lock and secure the hitch of an unhitched utility trailer. Another object of this invention is to allow a person to keep an unhitched utility trailer from being stolen when the utility trailer is not hooked to a truck hitch.

SUMMARY OF THE INVENTION

The present invention features a utility trailer security device comprising (a) a base 112 that can be releasably clamped to a tow ring 310, (b) a set of prongs (or claws) 114 constructed from a spring wire member, said set of prongs fixedly attached to the circumference of said base 112, wherein a free end 115 of each prong is used to clamp said base to said tow ring 310, (c) a locking post 118 having a first end 119b and a second end 119a, said second end 119a fixedly attached to a center of said base 112, said locking post is inserted through an aperture 116a housed within a center of a top plate 116, said top plate, said top plate sits on a top side of said tow ring 310, (d) a key lock 120 comprising a locking pin mechanism 124, said locking pin mechanism 124 is inserted through an aperture within said locking post 118a to lock said base 112 and said top plate 116 to one another and secure said tow ring 310 by preventing an insertion of a towing hook through the tow ring. The key lock 120 of the present invention is commonly known to one of ordinary skill (see, for example, U.S. Pat. No. 6,786,068, the disclosure of which is incorporated in its entirety by reference herein).

The present invention features a utility trailer security device comprising: a base 112; a first prong 114a, second prong 114b, and third prong 114c, each prong being constructed from a spring wire member, each prong being fixedly attached to an edge of a circumference of said base, wherein a free end of each prong projects upward from the base and curls towards a center of the base, the prongs are used to clamp to said base to a tow ring; the first prong is longer than the second and third prong, the free end of the first prong forms a hook-shape effective for hanging the base when the second and third prongs are not snapped around the tow ring; a locking post having a first end and a second end, said second end fixedly attached to a center of said base, said first end has a hole 118a; a top plate with an aperture 116a disposed at a center of the top plate, wherein said locking post is inserted through the aperture, said top plate sits on a top side of said tow ring; and a key lock comprising a locking pin mechanism, said locking pin mechanism is inserted through an aperture within said locking post to lock said base and said top plate to one another and secure said tow ring.

In some embodiments, the base 112 is constructed from stainless steel. In some embodiments, the top plate 116 is constructed from stainless steel.

In some embodiments, there are three prongs 114a, 114b and 114c, attached to the base. In some embodiments, the three prongs 114a, 114b and 114c are spaced about 120 degrees apart. In some embodiments, one of the prongs has a free end that is longer and has more of a hook shape than the other two prongs (see for example, 114a which has a longer free end than 114b).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is an illustration of a utility trailer security device including a base, a top plate, a locking post, and a key lock.

FIG. 2 is an exploded view of the utility trailer security device of FIG. 1.

DESCRIPTION OF PREFERRED EMBODIMENTS

Figure 3:
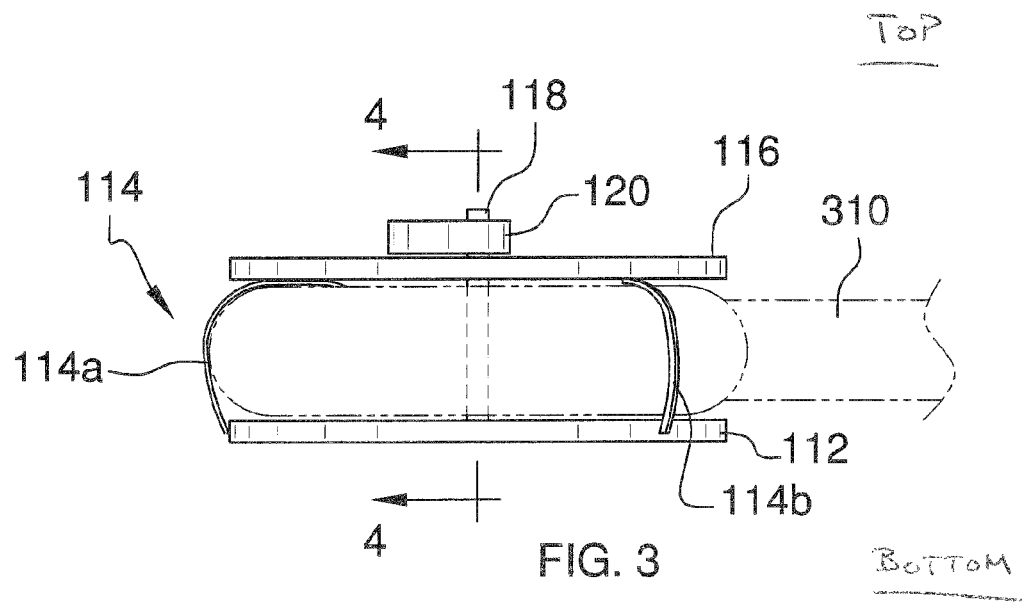
FIG. 3 is a side illustration of the utility trailer security device of FIG. 1.

Referring now to FIG. 1, utility trailer security device 100 is shown comprising base 112, set of prongs 114, top plate 116, locking post 118, and key lock 120. In the illustrated embodiment of FIG. 1, set of prongs 114 comprises first prong 114a, second prong 114b, and third prong 114c. In the illustrated embodiment of FIG. 1, locking post 118 comprises aperture 118a. In the illustrated embodiment of FIG. 1, key lock 120 comprises aperture 122 and locking mechanism 124. In the illustrated embodiment of FIG. 1, base 112 is placed on the bottom side of a pintle-style tow ring 310 and secured around the ring using set of prongs 114 (see FIG. 5). In the illustrated embodiment of FIG. 1, top plate 116 is placed on the top of the tow ring 310 (see FIG. 5). As a person places top plate 116 on top of the tow ring, locking post 118 is inserted through aperture 122. A person can then place key lock 120 over locking post 118 and use a key to lock and secure top plate 116 to the top of the tow ring 310 (see FIG. 5). In the illustrated embodiment of FIG. 1, a locking pin mechanism is inserted through aperture 118a when key lock 120 is in a locked position.

In certain embodiments, base 112 comprises a rigid material selected from the group consisting of metal (e.g., stainless steel), plastic, or combinations thereof. In certain embodiments, base 112 comprises a flat circular member having an outside diameter between about 3 inches and about 8 inches, for example 6 inches. In certain embodiments, base 112 comprises a thickness between about 0.2 inch and about 0.8 inch, for example 0.4 inch. In certain embodiments, set of prongs 114 comprises standard spring wire prongs known to one skilled in the art. In certain embodiments, top plate 116 comprises a rigid material selected from the group consisting of metal, plastic, or combinations thereof. In certain embodiments, top plate 116 comprises a flat circular member having an outside diameter between about 3 inches and about 8 inches, for example 6 inches. In certain embodiments, top plate 116 comprises a thickness between about 0.2 inch and about 0.8 inch, for example 0.4 inch. In certain embodiments, locking post 118 comprises a rigid material selected from the group consisting of metal, plastic, or combinations thereof. In certain embodiments, locking post 118 comprises a rectangular shaped member having a curved first end. In certain embodiments, locking post 118 comprises a length between about 1 inch and about 3 inches, for example 2 inches. In certain embodiments, locking post 118 comprises a width between about 0.75 inches and about 2 inches, for example 1 inch. In certain embodiments, locking post 118 comprises a thickness between about 0.2 inch and about 0.5 inch, for example 0.3 inch. In certain embodiments, key lock 120 comprises a standard pin locking mechanism known to one skilled in the art.

Referring now to FIG. 2, an exploded view of utility trailer security device 100 is shown comprising base 112, set of prongs 114, top plate 116, locking post 118, and key lock 120. In the illustrated embodiment of FIG. 1, set of prongs 114 comprises first prong 114a, second prong 114b, and third prong 114c. In the illustrated embodiment of FIG. 2, top plate 116 comprise aperture 116a. In the illustrated embodiment of FIG. 1, locking post 118 comprises aperture 118a. In the illustrated embodiment of FIG. 1, key lock 120 comprises aperture 122 and locking mechanism 124.

Referring now to FIG. 3, a side view of utility trailer security device 100 is shown comprising base 112, set of prongs 114, top plate 116, and key lock 120. In the illustrated embodiment of FIG. 3, base 112 is placed on the bottom side of a pintle-style tow ring 310 and secured around the ring using set of prongs 114. In the illustrated embodiment of FIG. 1, top plate 116 is placed on the top of the tow ring 310 (see FIG. 5). As a person places top plate 116 on top of the tow ring, locking post 118 is inserted through aperture 122. A person can then place key lock 120 over locking post 118 and use a key to lock and secure top plate 116 to the top of the tow ring 310 (see FIG. 5).

Figure 4:
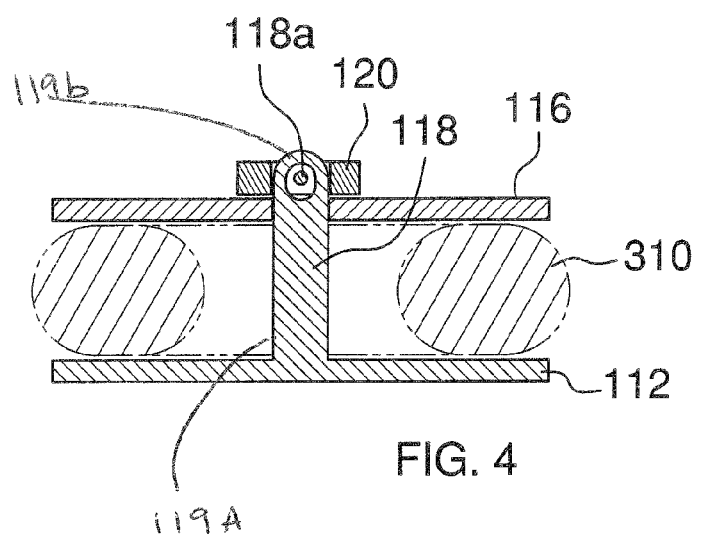
FIG. 4 is a front cross section view of the utility trailer security device of FIG. 1.

Referring now to FIG. 4, a front cross section view of utility trailer security device 100 is shown comprising base 112, top plate 116, locking post 118, and key lock 120. In the illustrated embodiment of FIG. 4, key lock 120 is inserted through aperture 118a when in a locked position. In the illustrated embodiment of FIG. 4, base 112 is plated on the bottom side of tow ring 310. In the illustrated embodiment of FIG. 4, top plate 116 is placed on the top side of tow ring 310. In the illustrated embodiment of FIG. 4, key lock 120 locks utility trailer security device 100 in place.

Figure 5:
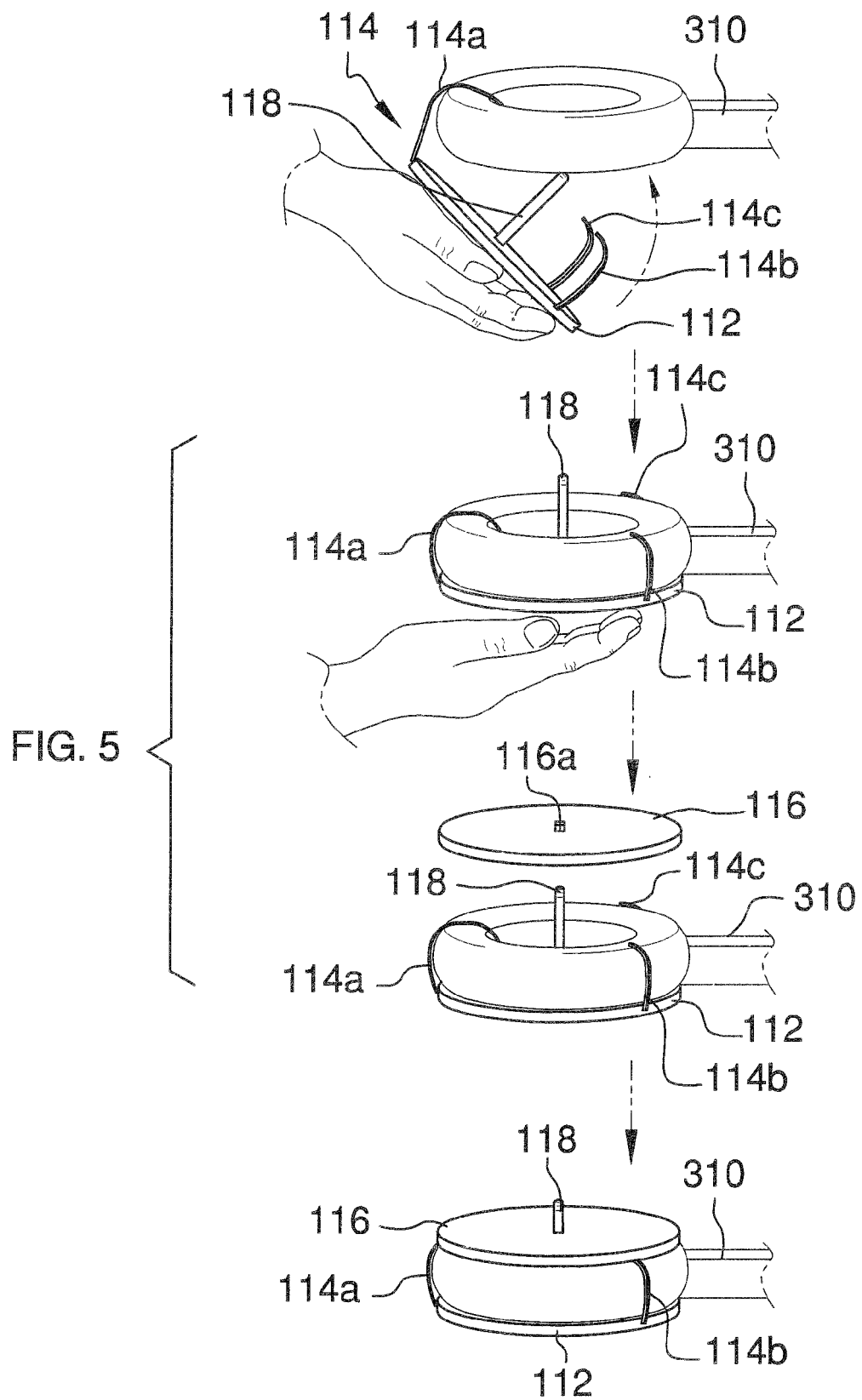
FIG. 5 is an illustration of the steps of how to attach the utility trailer security device of FIG. 1 to a truck hitch.

Referring now to FIG. 5, an illustration is shown of the steps of how to attach utility trailer security device 100 to tow ring 310. First, a person can hook first prong 114a over the top of tow ring 310. Second, a person can push base 112 in an upward direction until second prong 114b and third prong 114c attach over the top side of tow ring 310 and base 112 sits flat against the bottom of tow ring 310. Third, a person can place top plate over the top side of tow ring 310, inserting locking post 118 through aperture 116a. Last, a person can place key lock 120 over locking post 118 and lock key lock 120 to secure utility trailer security device 100 to tow ring 310 (see FIGS. 1 and 2).

The following the disclosures of the following U.S. Patents are incorporated in their entirety by reference herein: U.S. Pat. No. 6,786,068.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A utility trailer security device comprising:
    a base;
    a first prong, second prong, and third prong, each prong being constructed from a spring wire member, each prong being fixedly attached to an edge of a circumference of said base, wherein a free end of each prong projects upward from the base and curls towards a center of the base, the prongs are used to clamp said base to a tow ring; the first prong is longer than the second and third prong, the free end of the first prong forms a hook-shape effective for hanging the base when the second and third prongs are not snapped around the tow ring;
    a locking post having a first end and a second end, said second end fixedly attached to a center of said base, said first end has a hole,
    a top plate with an aperture disposed at a center of the top plate, wherein said locking post is inserted through the aperture, said top plate sits on a top side of said tow ring; and
    a key lock comprising a locking pin mechanism, said locking pin mechanism is inserted through an aperture within said locking post to lock said base and said top plate to one another and secure said tow ring.

\* \* \* \* \*